United States Patent
Agarwal

(10) Patent No.: US 12,182,552 B2
(45) Date of Patent: Dec. 31, 2024

(54) SPLITTING VECTOR PROCESSING LOOPS WITH AN UNKNOWN TRIP COUNT

(71) Applicant: Xilinx, Inc., San Jose, CA (US)

(72) Inventor: Ajit K. Agarwal, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 236 days.

(21) Appl. No.: 17/664,858

(22) Filed: May 24, 2022

(65) Prior Publication Data

US 2023/0385040 A1 Nov. 30, 2023

(51) Int. Cl.
G06F 8/41 (2018.01)

(52) U.S. Cl.
CPC .................... G06F 8/443 (2013.01)

(58) Field of Classification Search
CPC ....................................... G06F 8/443
See application file for complete search history.

(56) References Cited

U.S. PATENT DOCUMENTS

| | | | |
|---|---|---|---|
| 5,797,013 A * | 8/1998 | Mahadevan | G06F 8/443 717/160 |
| 5,802,375 A * | 9/1998 | Ngo | G06F 8/452 717/160 |
| 8,352,686 B2 * | 1/2013 | Ju | G06F 9/383 712/241 |
| 9,081,930 B1 | 7/2015 | Neuendorffer et al. | |
| 9,449,131 B2 | 9/2016 | Han et al. | |
| 9,710,584 B1 | 7/2017 | Hao et al. | |
| 9,824,172 B1 | 11/2017 | Hao et al. | |
| 9,898,266 B2 * | 2/2018 | Vasudevan | G06F 9/30038 |
| 10,013,517 B1 | 7/2018 | Zhou et al. | |
| 10,031,732 B1 | 7/2018 | Li et al. | |
| 10,108,769 B1 | 10/2018 | Li et al. | |
| 10,402,177 B2 * | 9/2019 | Bharadwaj | G06F 8/4441 |
| 10,579,584 B2 * | 3/2020 | Vorbach | G06F 15/80 |
| 10,586,003 B1 | 3/2020 | Suresh | |
| 10,671,779 B1 | 6/2020 | Neuendorffer | |
| 11,238,199 B1 | 2/2022 | Isoard et al. | |
| 11,256,489 B2 * | 2/2022 | Doshi | G06F 8/4442 |
| 2006/0048122 A1 * | 3/2006 | Barton | G06F 8/443 717/160 |
| 2007/0169059 A1 * | 7/2007 | Halambi | G06F 8/4452 717/160 |
| 2009/0158247 A1 * | 6/2009 | Tal | G06F 8/4452 717/106 |
| 2009/0307673 A1 * | 12/2009 | Eichenberger | G06F 8/452 717/160 |
| 2011/0145654 A1 * | 6/2011 | Dressler | G06F 8/443 714/39 |
| 2011/0238948 A1 * | 9/2011 | Vorbach | G06F 15/7867 712/15 |
| 2012/0167069 A1 * | 6/2012 | Lin | G06F 8/456 717/160 |
| 2013/0290943 A1 * | 10/2013 | Uliel | G06F 9/30043 717/160 |

(Continued)

Primary Examiner — Douglas M Slachta
(74) Attorney, Agent, or Firm — Kevin T. Cuenot

(57) ABSTRACT

A computer-based technique for processing an application includes determining that a loop of the application includes a reference to a data item of a vector data type. A trip count of the loop is determined to have an unknown trip count. The loop is split into a first loop and a second loop based on a splitting factor. The second loop is unrolled.

19 Claims, 6 Drawing Sheets

(56) References Cited

U.S. PATENT DOCUMENTS

| | | | | |
|---|---|---|---|---|
| 2014/0007061 A1* | 1/2014 | Perkins | ................... | G06F 8/443 |
| | | | | 717/150 |
| 2014/0096119 A1* | 4/2014 | Vasudevan | ................ | G06F 9/38 |
| | | | | 717/160 |
| 2021/0382700 A1* | 12/2021 | Watanabe | ................ | G06F 8/443 |
| 2023/0325319 A1* | 10/2023 | Howard | ................ | G06F 9/5066 |
| | | | | 711/118 |

* cited by examiner

```
1    for (unsigned i=0;i< LSIZE ; i++)
2            chess_prepare_for_pipelining
3            chess_loop_range(6,)
4            {
5            xbuff = upd_w(xbuff, 1, window_readincr_v8(cb_input));
6            acc0 = mul8(xbuff, 0, 0x76543210, 0, gain, 0, 0x00000000, 0);
7            ybuff0 = srs(acc0, shift);
8            window_writeincr(cb_output, ybuff0);
9            xbuff = upd_w(xbuff, 2, window_readincr_v8(cb_input));
10           acc1 = mul8(xbuff, 8, 0x76543210, 0, gain, 0, 0x00000000, 0);
11           ybuff1 = srs(acc1, shift);
12           window_writeincr(cb_output, ybuff1);
13   }
```

FIG. 2

```
1    for (unsigned i=0;i< LSIZE-4 ; i++)
2    chess_prepare_for_pipelining
3    chess_loop_range(6,)
4            {
5                    xbuff = upd_w(xbuff, 1, window_readincr_v8(cb_input));
6                    acc0 = mul8(xbuff, 0, 0x76543210, 0, gain, 0, 0x00000000, 0);
7                    ybuff0 = srs(acc0, shift);
8                    window_writeincr(cb_output, ybuff0);
9                    xbuff = upd_w(xbuff, 2, window_readincr_v8(cb_input));
10                   acc1 = mul8(xbuff, 8, 0x76543210, 0, gain, 0, 0x00000000, 0);
11                   ybuff1 = srs(acc1, shift);
12                   window_writeincr(cb_output, ybuff1);
13           }
14   for (unsigned i=0;i< 4 ; i++)
15   chess_flatten_loop
16           {
17                   xbuff = upd_w(xbuff, 1, window_readincr_v8(cb_input));
18                   acc0 = mul8(xbuff, 0, 0x76543210, 0, gain, 0, 0x00000000, 0);
19                   ybuff0 = srs(acc0, shift);
20                   window_writeincr(cb_output, ybuff0);
21                   xbuff = upd_w(xbuff, 2, window_readincr_v8(cb_input));
22                   acc1 = mul8(xbuff, 8, 0x76543210, 0, gain, 0, 0x00000000, 0);
23                   ybuff1 = srs(acc1, shift);
24                   window_writeincr(cb_output, ybuff1);
25           }
```

FIG. 3

SPLITTING VECTOR PROCESSING LOOPS WITH AN UNKNOWN TRIP COUNT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to program code compilation and optimization techniques. More particularly, this disclosure relates to loop splitting as applied to vector processing loops that have an unknown trip count.

BACKGROUND

Loop unrolling refers to a technique in which the body portion of a loop in program code is replicated a number of times so as to reduce the number of times loop branch logic is executed. A loop that executes a known number of times N may be fully unrolled so that the resulting program code includes N copies of the body portion of the loop. With the loop fully unrolled, the need for the loop branch logic is eliminated. This can increase the runtime efficiency of the compiled program code. With the loop unrolled, additional program code optimizations may be implemented that further increase the runtime efficiency of the resulting program code. Loop unrolling is also beneficial in cases where the program code is to be synthesized into hardware resulting in faster and/or more efficient hardware implementations.

SUMMARY

In one or more example implementations, a method can include determining, using computer hardware, that a loop of an application includes a reference to a data item of a vector data type. The method can include determining, using the computer hardware, that a trip count of the loop is unknown. The method can include splitting, using the computer hardware, the loop into a first loop and a second loop based on a splitting factor. The method also can include unrolling, using the computer hardware, the second loop.

In one or more example implementations, a system includes a processor configured to initiate operations. The operations can include determining that a loop of an application includes a reference to a data of a vector data type. The operations can include determining that a trip count of the loop is unknown. The operations can include splitting the loop into a first loop and a second loop based on a splitting factor. The operations also can include unrolling the second loop.

In one or more example implementations, a computer program product includes one or more computer-readable storage media, and program instructions collectively stored on the one or more computer-readable storage media. The program instructions are executable by computer hardware to initiate operations. The operations can include determining that a loop of an application includes a reference to a data item of a vector data type. The operations can include determining that a trip count of the loop is unknown. The operations can include splitting the loop into a first loop and a second loop based on a splitting factor. The operations also can include unrolling the second loop.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 is an example of a loop that may be detected within an application in the example of FIG. 1.

FIG. 3 is an example of the loop of FIG. 2 after performing loop splitting and unrolling operations as described in the example of FIG. 1.

DETAILED DESCRIPTION

Figure 1:
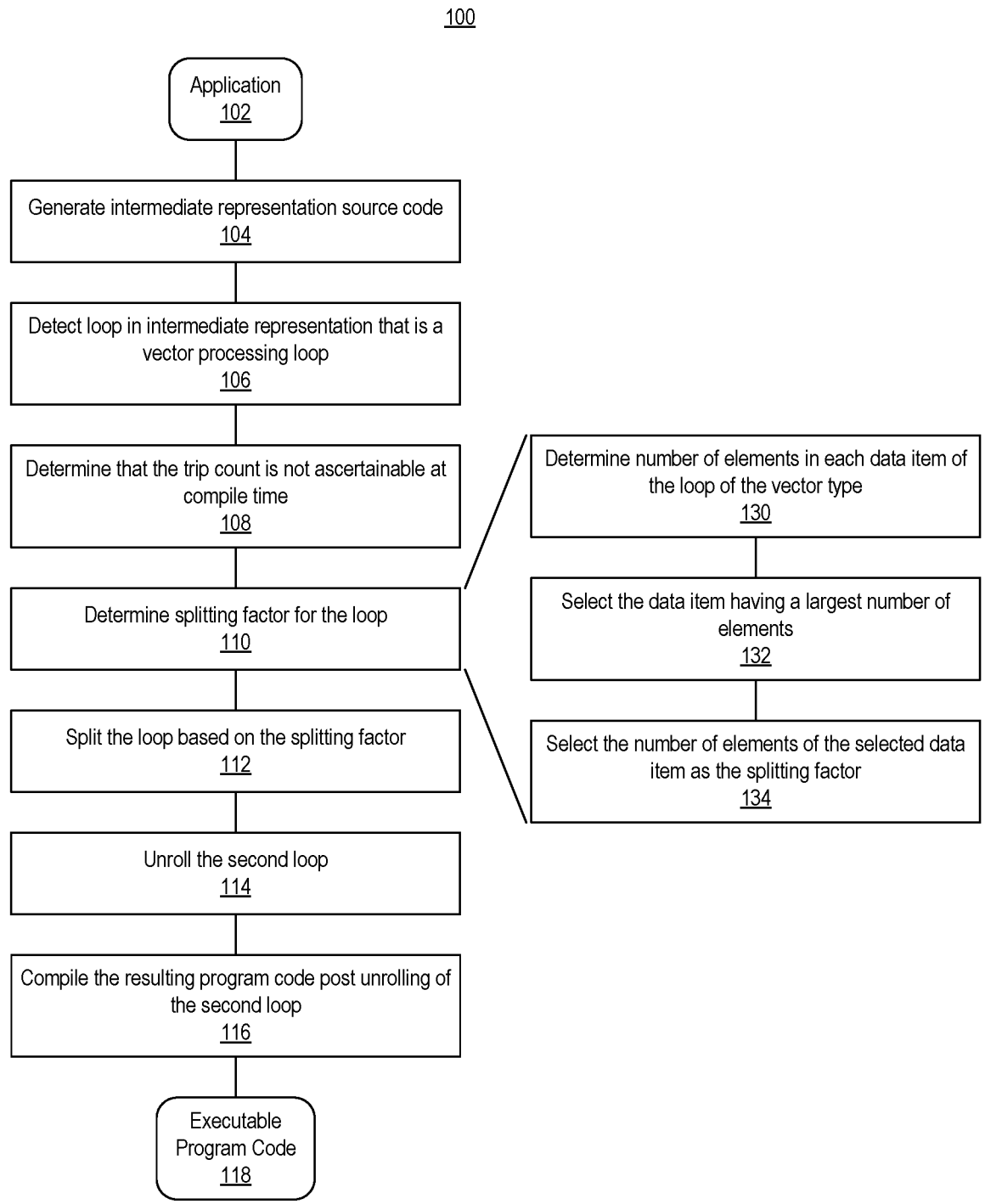
FIG. 1 illustrates an example method of processing an application.

This disclosure relates to program code compilation and optimization techniques. More particularly, this disclosure relates to loop splitting as applied to vector processing loops that have an unknown trip count. As defined within this disclosure, the term "loop," in reference to an application and/or computer programming, is a sequence of one or more instructions that is continually repeated until a certain condition is reached. As defined herein, the term "vector processing loop" means a loop that references one or more data items of the vector data type. The term "loop splitting" refers to a compiler optimization technique that attempts to simplify a loop or eliminate dependencies by breaking the loop into multiple loops that have the same loop bodies, but iterate over different contiguous portions of the index range.

Conventional compilers utilize a variety of heuristics to determine whether to apply loop splitting to a given loop of an application. In general, a conventional compiler does not split loops in the presence of function calls and intrinsics where the trip count is not known. For example, if a conventional compiler detects intrinsics and/or function calls in the loop, loop splitting is not performed on the loop. Similarly, if a conventional compiler is not able to determine the trip count of the loop at compile time, loop splitting is not performed on the loop. In another example, conventional compilers are unconcerned with heuristics relating to better modulo scheduled loops, register pressures, and/or loop vectorization. Such compilers do not consider other heuristics such as vector intrinsics, the use of vector data types, or the number of elements of the vector data types within the loop. By leaving the loop intact, the opportunities to optimize execution of the compiled application and/or a hardware implementation of the application are lost.

In accordance with the inventive arrangements described within this disclosure, method, systems, and computer program products are disclosed that are capable of applying loop splitting techniques to vector processing loops that have a trip count that is unknown at compile time. The application of loop splitting, as described herein, results in program code that may be executed more efficiently. For example, from the loop splitting, one of the resulting loops may be unrolled. This facilitates more efficient execution of the program code than had the loop not been split and at least partially unrolled. Further, the application of loop splitting and/or unrolling, as described herein, results in program code that may be synthesized into a more efficient hardware implementation than had the loop splitting and/or unrolling not been performed.

The inventive arrangements described herein are capable of generating multiple loops from an initial (e.g., single) loop that facilitate operations such as loop vectorization as may be performed by an SLP Vectorizer (e.g., of a compiler). The SLP Vectorizer, or another similar type of vectorizer, is capable of merging multiple scalars found in program code into vectors. This operation often translates into improved performance in executing modulo scheduled loops and may alleviate register pressures.

Further aspects of the inventive arrangements are described below with reference to the figures.

FIG. 1 illustrates an example method 100 of processing an application. The operations described in connection with FIG. 1 may be performed by a data processing system executing suitable program code. An example of a data processing system that is capable of performing the operations described with reference to FIG. 1 is described in connection with FIG. 5.

In an example implementation, the data processing system may execute a compiler that is capable of generating an executable version of an application initially specified in source code. In one aspect, the compiler may be included in an Electronic Design Automation (EDA) system. The EDA system is capable of compiling the source code for execution on one or more target hardware platforms. An example of a hardware platform that is capable of executing a compiled version of the application is a vector processor or a plurality of interconnected vector processors. In the case of a plurality of interconnected vector processors, the vector processors may be arranged in an array.

In one aspect, the class of vector processors capable of executing the compiled application are those that support more complex vector intrinsics. Unlike Single Instruction Multiple Data (SIMD) type processors, a vector processor is characterized by the ability to specify or set the vector length. This capability typically is implemented as an instruction for setting the vector length. In addition, a vector processor, unlike an SIMD type of processor is characterized by the ability to iterate and reduce (e.g., process and/or manipulate) elements within a given vector.

An SIMD type of processor, for example, uses an SIMD instruction set that does not support more complex vector intrinsics such as those described. Examples of complex vector intrinsics not supported by SIMD instruction sets include, but are not limited to, bitwise operations such as converting the upper bit portion of an instruction to a lower bit portion of an instruction and/or extracting a one or more upper bits from an instruction and assigning the extracted bit(s) to a particular destination. Other examples of complex vector intrinsics include iteration and reduction of elements within a vector such as splitting a vector data type into a plurality of smaller vector data types. These types of more complex vector intrinsics are not supported by SIMD processors. Accordingly, a conventional processor that supports SIMD operation is not considered a vector processor within this disclosure.

Referring to FIGS. 1-3, the data processing system (system) receives an application 102 as an input. Application 102 is specified in source code. As defined within this disclosure, the term "source code" means a collection of computer instructions written using a human-readable computer language such as text. Different computer languages may be expressed as source code. For example, hardware description language (HDL) such as VHDL and/or Verilog may be expressed as source code and subsequently compiled, e.g., synthesized, placed, and/or routed. High-level programming languages such as C/C++ may be expressed as source code and subsequently compiled, e.g., into object code or an executable binary for execution by a processor. In one or more example implementations, application 102, being specified in source code, may specify a data flow graph that is compiled by the system.

In block 104, the system is capable of generating an intermediate representation of application 102. As defined within this disclosure, the term "intermediate representation" is the code, specified as a data structure, used internally by a compiler or a virtual machine to represent source code. A compiler translates high-level programming language source code into an intermediate representation to perform further operations on the source code. An intermediate representation is designed to be conducive to further processing, such as optimization of source code and further translation of the source code into an executable or a hardware implementation. An intermediate representation is an accurate representation of the source code that is capable of representing the source code without loss of information and is independent of any particular source or target language. In some cases, the intermediate representation may use a static single assignment (SSA) compliant form. Examples of intermediate representations include, but are not limited to, stack machine code, two address code, three address code, and/or a graph data structure. Other examples of intermediate representations may include, but are not limited to, Low Level Virtual Machine (LLVM) intermediate representation and GNU Compiler Collection (GCC) intermediate representation.

In block 106, the system is capable of detecting a loop in application 102. The system is capable of detecting a vector processing loop. For example, the system analyzes the intermediate representation of application 102 as generated in block 104 and detects a loop or loops that reference one or more data items, e.g., variables, of the vector data type. The data item(s) of the vector data type detected within the loop may be explicitly recited in the loop as an argument, e.g., of a vector intrinsic, and/or referenced by a function of the loop.

FIG. 2 is an example of a loop that may be detected within application 102 in block 106. In the example of FIG. 2, the loop is a "for" loop. The body of the loop includes one or more vector intrinsics. For example, the loop includes the "upd_w" vector intrinsic in lines 5 and 9, and the "srs" vector intrinsic in lines 7 and 11. In general, an intrinsic function is a function (e.g., a subroutine) that is available for use in a given programming language and whose implementation is handled specially by the compiler.

In the example of FIG. 2, the "upd" vector intrinsic may be used to insert an individual element into a vector. In general, the "upd" vector intrinsic allows one to update one or more elements of a specified vector A with a given value B based on a provided index IDX. For purposes of illustration, a corollary to the "upd" vector intrinsic is the "ext" vector intrinsic which may be used to extract an individual element from a vector. In general, the "ext" vector intrinsic allows one to extract one or more elements of a specified vector A based on a provided index IDX.

In the example of FIG. 2, the "srs" vector intrinsic may be used to move values from an accumulator data type to a vector data type. These data types may be stored in different registers in particular vector processors. Examples of vector intrinsics that are capable of moving values from an accumulator data type to a vector data type include, but are not limited to:

bsrs: converts a 48-bit accumulator data into a signed 8-bit vector;

ubsrs: converts a 48-bit accumulator data into an unsigned 8-bit vector;

srs: converts a 48-bit accumulator data into a corresponding 16-bit vector, or converts an 80-bit accumulator data into a corresponding 32-bit vector; and lsrs: converts a 48-bit accumulator data into a corresponding 32-bit vector, or converts an 80-bit accumulator data into a corresponding 64-bit vector.

The example vector intrinsics described within this disclosure are provided for purposes of illustration and not limitation. It should be appreciated that depending on the compiler and/or the target hardware architecture upon which the application 102 is to be executed (e.g., the instruction set used by the target hardware architecture), the particular vector intrinsics may vary. Still, the vector intrinsics will be a predetermined set of vector intrinsics that the system may detect within the application 102 once converted into the intermediate representation.

Referring to the example of FIG. 2, the system is capable of detecting vector data types within the loop body. In FIG. 2, the variable "xbuff" may be a vector data type. For purposes of illustration, the data type of "xbuff" is defined elsewhere in application 102, e.g., external to the example loop of FIG. 2.

Thus, in the example of FIG. 1, referring to block 106, the system is capable of identifying a loop from application 102 that is considered a vector processing loop using any of a variety of different techniques. The system is capable of detecting one or more vector intrinsics of the loop, one or more references to one or more data items of vector data types, or both. As used herein, the phrase "references to one or more data items of vector data types" includes the loop having one or more data items of the vector data type recited therein explicitly as argument(s) of vector intrinsic(s) or recited therein as argument(s) of other function(s). It should be appreciated that the loop may include other functions therein and/or other scalar intrinsics.

In block 108, the system determines that the trip count is not ascertainable at compile time, e.g., is unknown at compile time. That is, the system determines that the value of the trip count cannot be determined at compile time and is only knowable at runtime (e.g., upon execution) of application 102. The trip count of a loop is the minimum number of times the loop is executed at runtime. To know the trip count at compile-time, the value must be a constant.

An example scenario in which the system may be unable to determine the trip count at compile time is in the case of a loop having a loop control construct that counts up to measure the number of times the loop executes. That is, the loop control variable is incremented for each iteration of the loop. Referring to the example of FIG. 2, the loop control construct (e.g., line 1) includes the loop variable "i" that is incremented to track iterations of the loop. Other examples of cases where the trip count is unknown at compile time may include, but are not limited to, situations in which the upper bound of the loop is a dynamic variable or is a dynamic expression.

In block 110, the system determines a splitting factor for the loop. In one or more example implementations, the splitting factor is the width of the largest data item of vector data type referenced in the loop. In one aspect, in cases where the trip count is not ascertainable as a constant at compile time, the system uses the splitting factor, which is determined as a constant, as the trip count. This allows the compiler to proceed with optimizations such as loop splitting and/or loop unrolling that are not possible with a trip count that is unknown at compile time.

For purpose of illustration, as part of performing block 110, the system is capable of performing blocks 130, 132, and 134. In block 130, the system is capable of determining a number of elements in each data item (e.g., variable) referenced by the loop that is of the vector data type. In one or more examples, the system is capable of finding the declaration for each of the data items (e.g., variables) referenced by the loop. The declaration may be in the loop or outside of the loop. From the declaration, the system may determine the data type and width for each data item of the vector data type. In another example, the system may determine the widths of the data items based on the particular vector intrinsic that operates on the data items in the case where that data item is an argument of a vector intrinsic. As previously illustrated, some vector intrinsics are specific to particular vector sizes and/or take the vector size as an argument.

In one or more examples, the width of a data item of vector type may be the number of elements of the data item. Thus, for example, the data splitting factor, being the width, may be expressed as a number of elements of the largest data item of vector type.

In the example, the vectors include 4 integers. Thus, the number of elements is 4. In block 132, the system selects the data item of vector data type from block 130 that has a largest number of elements. In block 134, the system selects the number of elements of the selected data item (e.g., the data item selected in block 132) as the splitting factor.

In block 112, the system splits the loop based on the splitting factor. The system splits the loop into a first loop and a second loop. In block 114, the system unrolls the second loop. In one aspect, the second loop may be unrolled since the trip count is known. The operations described herein effectively transform a loop into a first loop with an unknown trip count that may not be unrolled and a second loop with a known trip count that may be unrolled. In block 116, the system is capable of compiling the resulting program code (e.g., in intermediate format) post unrolling of the second loop to generate executable program code 118 that may be executed on a target hardware architecture.

FIG. 3 is an example of the loop of FIG. 2 after performing loop splitting as described in connection with FIG. 1. It should be appreciated that the operations performed are performed while the application is still in the intermediate representation. The example of FIG. 3, being provided in source code form, is for purposes of illustration only.

Figure 4:
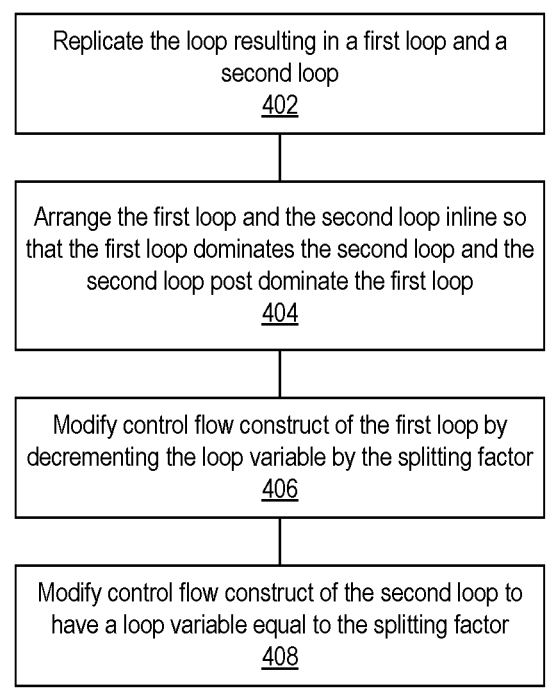
FIG. 4 illustrates example operations of the system in performing the loop splitting operation described in the example of FIG. 1.

FIG. 4 illustrates example operations performed by the system to implement the loop splitting described in connection with block 112 of FIG. 1. Referring to FIGS. 3 and 4, in block 402, the system replicates, or clones, the loop resulting in a first loop and a second loop. In the example of FIG. 3, the first loop is from line 1 to line 13. The second loop is from line 14 to line 25.

In block 404, the system arranges the first loop and the second loop inline within the application so that the first loop dominates the second loop and the second loop post dominate the first loop. In the example of FIG. 2, the first loop is said to dominate the second loop since every path from the entry point of the application to the second loop must flow through the first loop. The second loop is said to post dominate the first loop since all paths that exit the application starting at the first loop must flow through the second loop. In one aspect, the system arranges the first loop and the second loop so that there are no intervening instructions between the first loop and the second loop as split.

In block 406, the system modifies the control flow construct of the first loop body by decrementing the loop control condition by the splitting factor. In the example of FIG. 3, at line 1, the loop control condition is "LSIZE" and is decremented by "4," which is the splitting factor in this example. As known, the loop control condition is the particular condition to which the loop control variable, e.g., "i" in this example, is compared to determine when to exit the loop.

In block 408, the system modifies the control flow construct for the second loop to have a loop control condition that is equal to the splitting factor. In the example of FIG. 3, at line 14, the loop control condition is set equal to the value "4," which is the value of the splitting factor in this example.

In performing the loop splitting, the dominator tree of the intermediate representation and functionality of the intermediate representation, which may be considered a type of control flow graph (CFG), is preserved. For example, all edges of the CFG are maintained post-loop splitting. The trip count is updated. In cloning the loop and performing the operations described in the example of FIG. 4, the system ensures that the SSA properties are preserved. For example, the post-order traversal of the original loop body (e.g., the first loop) to the cloned loop (e.g., the second loop) is preserved. The CFG hierarchy is preserved. The system is capable of patching any PHI nodes of the cloned body with the new loop body structure. Such operations may be performed in a separate module pass.

In the example of FIG. 4, one or more additional instructions such as compiler directives may be included and/or removed in the first and/or second loops. For example, the "chess_flatten_loop" may be a compiler directive to unroll the loop. Accordingly, the system, in compiling the program code, is capable of including such a compiler directive in the second loop and unrolling the second loop. As noted, the second loop has a known trip count so that loop unrolling may be performed unlike the first loop with an unknown trip count.

In one or more example implementations, the operations described herein in connection with FIGS. 1-4 may be performed automatically in response to detecting loops that meet the criteria described herein. In one or more other example implementations, the operations described herein in connection with FIGS. 1-4 may be performed in response to a user request to do so during compilation or in response to detecting a particular compiler directive that enumerates one or more loops of the application to which the operations described are to be performed.

In general, loop splitting reduces the number of times a loop is executed. This allows the loop to be pipelined and reduces register pressure, resulting in fewer load and store instructions. Register pressure refers to the number of hard registers needed to store values in the pseudo-registers at a given program point during the compilation process.

As noted, a loop processed as described herein may include a mixture of vector and scalar intrinsics. In one example, for a scalar instruction that operates on an area of 4, such an instruction can be vectorized to a vector of 4. Once the loop is unrolled, optimizations for vectorization such as this may be observed in the straight-line (e.g., unrolled) program code. Without performing the loop splitting and/or unrolling described herein, the vectorizations would not be performed as the program code was not unrolled (e.g., not straight-line program code).

Figure 5:
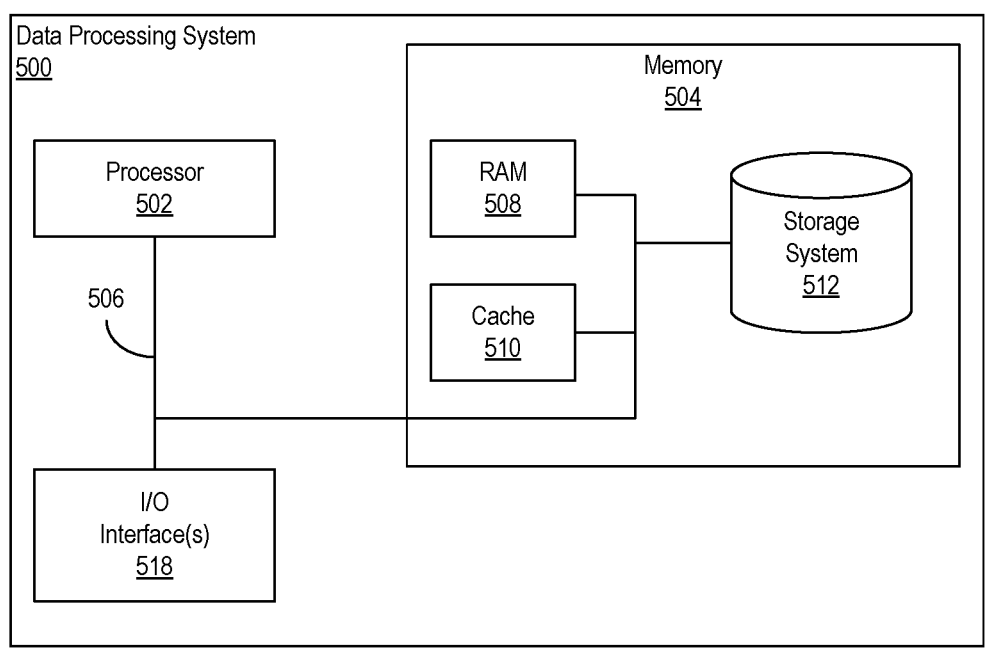
FIG. 5 illustrates an example implementation of a data processing system for use with the inventive arrangements described herein.

FIG. 5 illustrates an example implementation of a data processing system 500. As defined herein, the term "data processing system" means one or more hardware systems configured to process data, each hardware system including at least one processor and memory, wherein the processor is programmed with computer-readable instructions that, upon execution, initiate operations. Data processing system 500 can include a processor 502, a memory 504, and a bus 506 that couples various system components including memory 504 to processor 502.

Processor 502 may be implemented as one or more processors. In an example, processor 502 is implemented as a central processing unit (CPU). Processor 502 may be implemented as one or more circuits capable of carrying out instructions contained in program code. The circuit may be an integrated circuit or embedded in an integrated circuit. Processor 502 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 506 represents one or more of any of a variety of communication bus structures. By way of example, and not limitation, bus 506 may be implemented as a Peripheral Component Interconnect Express (PCIe) bus. Data processing system 500 typically includes a variety of computer system readable media. Such media may include computer-readable volatile and non-volatile media and computer-readable removable and non-removable media.

Memory 504 can include computer-readable media in the form of volatile memory, such as random-access memory (RAM) 508 and/or cache memory 510. Data processing system 500 also can include other removable/non-removable, volatile/non-volatile computer storage media. By way of example, storage system 512 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 506 by one or more data media interfaces. Memory 504 is an example of at least one computer program product.

Memory 504 is capable of storing computer-readable program instructions that are executable by processor 502. For example, the computer-readable program instructions can include an operating system, one or more application programs (e.g., a compiler and/or EDA program code), other program code, and program data. Processor 502, in executing the computer-readable program instructions, is capable of performing the various operations described herein that are attributable to a computer or data processing system. It should be appreciated that data items used, generated, and/or operated upon by data processing system 500 are functional data structures that impart functionality when employed by data processing system 500. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 500 may include one or more Input/Output (I/O) interfaces 518 communicatively linked to bus 506. I/O interface(s) 518 allow data processing system 500 to communicate with one or more external devices and/or communicate over one or more networks such as a local area network (LAN), a wide area network (WAN), and/or a public network (e.g., the Internet). Examples of I/O interfaces 518 may include, but are not limited to, network cards, modems, network adapters, hardware controllers, etc. Examples of external devices also may include devices that allow a user to interact with data processing system 500 (e.g., a display, a keyboard, and/or a pointing device) and/or other devices such as accelerator card.

Data processing system 500 is only one example implementation. Data processing system 500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 5 is not intended to suggest any limitation as to the scope of use or functionality of example implementations described herein. Data processing system 500 is an example of computer hardware that is capable of performing the various operations described within this disclosure. In this regard, data processing system 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 6:
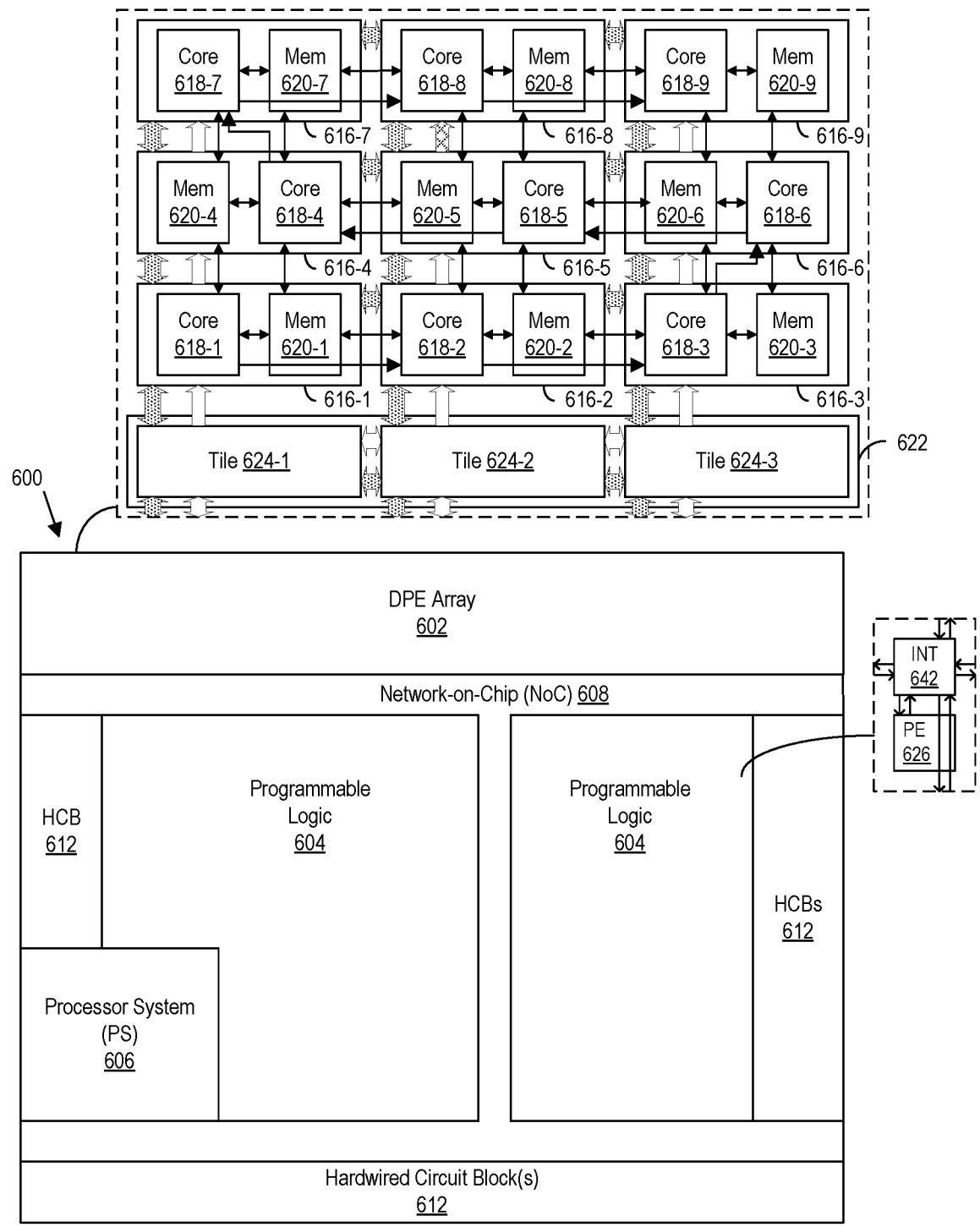
FIG. 6 illustrates an example architecture for an integrated circuit having hardware capable of executing an application as processed and compiled herein.

FIG. 6 illustrates an example architecture for an IC 600 having hardware capable of executing an application as processed and compiled herein. IC 600 is an example of a programmable IC and an adaptive system. In one aspect, IC 600 is also an example of a System-on-Chip (SoC). In the example of FIG. 6, IC 600 is implemented on a single die provided within a single integrated package. In other examples, IC 600 may be implemented using a plurality of interconnected dies where the various programmable circuit resources illustrated in FIG. 6 are implemented across the different interconnected dies.

In the example, IC 600 includes DP array 602, programmable logic 604, a processor system 606, a Network-on-Chip (NoC) 608, and one or more hardwired circuit blocks 612. It should be appreciated that the architecture of IC 600 is provided for purposes of illustration and not limitation. An IC for use with the inventive arrangements described herein may include any of a variety of combinations of the subsystems described herein so long as one or more vector processors are included.

DP array 602 is implemented as a plurality of interconnected and programmable compute tiles 616. The term "tile," as used herein in connection with FIG. 6, means a circuit block. Compute tiles 616 may be arranged in an array and are hardwired. Each compute tile 616 can include one or more cores 618 and a memory circuit (abbreviated "Mem" in FIG. 6) 620. In one aspect, each core 618 is capable of executing program code stored in a core-specific program memory contained within each respective core (not shown). In one aspect, each core 618 may be implemented as a vector processor.

In one or more examples, each core 618 is capable of directly accessing the memory circuit 620 within the same compute tile 616 and the memory circuit 620 of any other compute tile 616 that is adjacent to the core 618 of the compute tile 616 in the up, down, left, and/or right directions. For example, core 618-5 is capable of directly reading and/or writing (e.g., via respective memory interfaces not shown) memory circuits 620-5, 620-8, 620-6, and 620-2. Core 618-5 sees each of memory circuits 620-5, 620-8, 620-6, and 620-2 as a unified region of memory (e.g., as a part of the local memory accessible to core 618-5). This facilitates data sharing among different compute tiles 616 in DP array 602. In other examples, core 618-5 may be directly connected to memory circuits 620 in other compute tiles.

Compute tiles 616 are interconnected by programmable interconnect circuitry. The programmable interconnect circuitry may include one or more different and independent networks. For example, the programmable interconnect circuitry may include a streaming network formed of streaming connections (shaded arrows) and a memory-mapped network formed of memory-mapped connections (unshaded arrows).

Cores 618 may be directly connected with adjacent cores 618 via core-to-core cascade connections. In one aspect, core-to-core cascade connections are unidirectional and direct connections between cores 618 as pictured. In another aspect, core-to-core cascade connections are bidirectional and direct connections between cores 618. In general, core-to-core cascade connections generally allow the results stored in an accumulation register of a source core 618 to be provided directly to an input of a target or load core 618 without traversing the programmable interconnects and/or being written by a first core 618 to a memory circuit 620 to be read by a different core 618.

In an example implementation, compute tiles 616 do not include cache memories. By omitting cache memories, DP array 602 is capable of achieving predictable, e.g., deterministic, performance. Further, significant processing overhead is avoided since maintaining coherency among cache memories located in different compute tiles 616 is not required. In a further example, cores 618 do not have input interrupts. Thus, cores 618 are capable of operating uninterrupted. Omitting input interrupts to cores 618 also allows DP array 602 to achieve predictable, e.g., deterministic, performance.

Interface block 622 operates as an interface that connects compute tiles 616 to other resources of IC 600. In the example of FIG. 6, interface block 622 includes a plurality of interconnected interface tiles 624 organized in a row. Interface tiles 624 are connected so that data may be propagated from one interface tile to another bi-directionally. Each interface tile 624 is capable of operating as an interface for the column of compute tiles 616 directly above and is capable of interfacing such compute tiles 616 with components and/or subsystems of IC 600 including, but not limited to, programmable logic 604 and/or NoC 608. It should be appreciated that DP array 602 may include memory tiles (not shown) that may be interspersed with the compute tiles 616 illustrated.

Programmable logic 604 is circuitry that may be programmed to perform specified functions. As an example, programmable logic 604 may be implemented as field-programmable gate array type of circuitry. programmable logic 604 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of programmable logic is highly configurable unlike hardwired circuitry. Each programmable circuit block of programmable logic 604 typically includes a programmable element 626 (e.g., a functional element) and a programmable interconnect 642. The programmable interconnects 642 provide the highly configurable topology of programmable logic 604. The programmable interconnects 642 may be configured on a per wire basis to provide connectivity among the programmable elements 626 of programmable circuit blocks of programmable logic 604 and is configurable on a per-bit basis (e.g., where each wire conveys a single bit of information) unlike connectivity among compute tiles 616, for example, that may include multi-bit stream connections capable of supporting packet-based communications.

Processor system 606 is implemented as hardwired circuitry that is fabricated as part of IC 600. Processor system 606 may be implemented as, or include, any of a variety of different processor types each capable of executing program code. For example, processor system 606 may be implemented as one or more processors. Each processor may include one or more cores. Each processor and/or core is capable of executing program code. In still another example, processor system 606 may include one or more processors, cores, modules, co-processors, I/O interfaces, and/or other resources. Processor system 606 may be implemented using any of a variety of different types of architectures. Example architectures that may be used to implement processors and/or cores of processor system 606 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like. In one or more example implementations, processor system 606 may execute a control program that controls execution of an application (e.g., one or more kernels) within DP array 602.

In one or more example implementations, processor system 606 may execute a control program that controls execution of an application (e.g., one or more kernels) within DP array 602.

NoC 608 is a programmable interconnecting network for sharing data between endpoint circuits in IC 600. The endpoint circuits can be disposed in DP array 602, programmable logic 604, processor system 606, and/or selected hardwired circuit blocks 612. NoC 608 can include high-speed data paths with dedicated switching. In an example, NoC 608 includes one or more horizontal paths, one or more vertical paths, or both horizontal and vertical path(s). The arrangement and number of regions shown in FIG. 6 is merely an example. NoC 608 is an example of the common infrastructure that is available within IC 600 to connect selected components and/or subsystems.

Within NoC 608, the nets that are to be routed through NoC 608 are unknown until a user circuit design is created for implementation within IC 600. NoC 608 may be programmed by loading configuration data into internal configuration registers that define how elements within NoC 608 such as switches and interfaces are configured and operate to pass data from switch to switch and among the NoC interfaces to connect the endpoint circuits. NoC 608 is fabricated as part of IC 600 (e.g., is hardwired) and, while not physically modifiable, may be programmed to establish connectivity between different master circuits and different slave circuits of a user circuit design. NoC 608, upon power-on, does not implement any application data paths or routes therein, but may provide default paths for loading configuration data into selected other subsystems. Once configured, however, NoC 608 implements data paths or routes between endpoint circuits.

Hardwired circuit blocks 612 include special-purpose circuit blocks fabricated as part of IC 600. Though hardwired, hardwired circuit blocks 612 may be configured by loading configuration data into control registers to implement one or more different modes of operation. Examples of hardwired circuit blocks 612 may include input/output (I/O) blocks, transceivers for sending and receiving signals to circuits and/or systems external to IC 600, memory controllers, or the like. Examples of different I/O blocks may include single-ended and pseudo differential I/Os. Examples of transceivers may include high-speed differentially clocked transceivers. Other examples of hardwired circuit blocks 612 include, but are not limited to, cryptographic engines, digital-to-analog converters (DACs), analog-to-digital converters (ADCs), and the like. In general, hardwired circuit blocks 612 are application-specific circuit blocks.

In one or more other examples, hardwired circuit blocks 612 may include a RAM, e.g., one or more banks of RAM. As an example, the RAM may be a Double Data Rate (DDR) Synchronous Dynamic RAM. In still another example, hardware circuit blocks 612 may include a High-Bandwidth Memory (HBM).

The various programmable circuit resources illustrated in FIG. 6 may be programmed initially as part of a boot process for IC 600. During runtime, the programmable circuit resources may be reconfigured. At any point during runtime, all or a portion of IC 600 may be reconfigured. In some cases, processor system 606 or another processing system disposed in IC 600 may configure and/or reconfigure programmable logic 604 and/or NoC 608.

An application compiled as described herein may be executed using the DP array where different portions of the executable program code are apportioned or mapped to different ones of the compute tiles 616 for execution by the cores 618 included therein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

A method can include determining, using computer hardware, that a loop of an application includes a reference to a data item of a vector data type. The method can include determining, using the computer hardware, that a trip count of the loop is unknown. The method can include splitting, using the computer hardware, the loop into a first loop and a second loop based on a splitting factor. The method can include unrolling, using the computer hardware, the second loop.

The foregoing and other implementations can each optionally include one or more of the following features, alone or in combination. Some example implementations include all the following features in combination.

In another aspect, the application is initially specified as source code. The method can include first converting the source code into an intermediate representation.

In another aspect, the method can include determining each data item of the loop that is of the vector data type, determining a number of elements of each data item of the loop of the vector data type, and selecting the data item of the loop of the vector data type having a largest number of elements and using the number of elements of the selected data item as the splitting factor.

In another aspect, the method can include compiling the application into executable program code.

In another aspect, first loop has an unknown trip count and the second loop has a known trip count.

In another aspect, the method can include modifying a control flow construct of the first loop by decrementing a loop control condition of the control flow construct of the first loop by the splitting factor.

In another aspect, the method can include modifying a control flow construct of the second loop to have a loop control condition equal to the splitting factor.

In another aspect, the first loop dominates the second loop and the second loop post dominates the first loop.

In another aspect, a system having a processor is capable of initiating and/or performing the various operations described within this disclosure. In still another aspect, a computer program product includes one or more computer-readable storage media, and program instructions collectively stored on the one or more computer-readable storage media, wherein the program instructions are executable by computer hardware to initiate the various operations described within this disclosure.

What is claimed is:

1. A method, comprising:
    detecting, using computer hardware, that a loop of an application refers to one or more data items each of a vector data type;
    wherein a trip count of the loop is unknown;
    selecting, from the one or more data items, a selected data item having a largest number of elements based on a number of elements of each data item of the vector data type of the loop and using the number of elements of the selected data item as a splitting factor;
    splitting, using the computer hardware, the loop into a first loop and a second loop based on the splitting factor; and
    unrolling, using the computer hardware, the second loop.

2. The method of claim 1, wherein the application is initially specified as source code, the method further comprising:
    first converting the source code into an intermediate representation.

3. The method of claim 1, further comprising:
    compiling the application into executable program code.

4. The method of claim 1, wherein the first loop has an unknown trip count and the second loop has a known trip count.

5. The method of claim 1, further comprising:
    modifying a control flow construct of the first loop by decrementing a loop control condition of the control flow construct of the first loop by the splitting factor.

6. The method of claim 4, further comprising:
    modifying a control flow construct of the second loop to have a loop control condition equal to the splitting factor.

7. The method of claim 4, wherein the first loop dominates the second loop and the second loop post dominates the first loop.

8. A system, comprising:
a processor configured to initiate operations including:
detecting that a loop of an application refers to one or more data items each of a vector data type;
wherein a trip count of the loop is unknown;
selecting, from the one or more data items, a selected data item having a largest number of elements based on a number of elements of each data item of the vector data type of the loop and using the number of elements of the selected data item as a splitting factor;
splitting the loop into a first loop and a second loop based on the splitting factor; and
unrolling the second loop.

9. The system of claim 8, wherein the application is initially specified as source code, and wherein the processor is configured to initiate operations comprising:
first converting the source code into an intermediate representation.

10. The system of claim 8, wherein the first loop has an unknown trip count and the second loop has a known trip count.

11. The system of claim 8, wherein the processor is configured to initiate operations comprising:
compiling the application into executable program code.

12. The system of claim 10, wherein the processor is configured to initiate operations comprising:
modifying a control flow construct of the first loop by decrementing a loop control condition of the control flow construct of the first loop by the splitting factor.

13. The system of claim 10, wherein the processor is configured to initiate operations comprising:
modifying a control flow construct of the second loop to have a loop control condition equal to the splitting factor.

14. The system of claim 10, wherein the first loop dominates the second loop and the second loop post dominates the first loop.

15. A computer program product, comprising:
one or more computer-readable storage mediums, and program instructions collectively stored on the computer-readable storage mediums, wherein the program instructions are executable by computer hardware to initiate operations including:
detecting, using computer hardware, that a loop of an application refers to one or more data items each of a vector data type;
wherein a trip count of the loop is unknown;
selecting, from the one or more data items, a selected data item having a largest number of elements based on a number of elements of each data item of the vector data type of the loop and using the number of elements of the selected data item as a splitting factor;
splitting the loop into a first loop and a second loop based on a splitting factor; and
unrolling the second loop.

16. The computer program product of claim 15, wherein the application is initially specified as source code, and wherein the program instructions are executable by computer hardware to initiate operations including:
first converting the source code into an intermediate representation.

17. The computer program product of claim 15, wherein the first loop has an unknown trip count and the second loop has a known trip count.

18. The computer program product of claim 15, wherein the program instructions are executable by computer hardware to initiate operations including:
modifying a control flow construct of the first loop by decrementing a loop control condition of the control flow construct of the first loop by the splitting factor; and
modifying a control flow construct of the second loop to have a loop control condition equal to the splitting factor.

19. The computer program product of claim 17, wherein the first loop dominates the second loop and the second loop post dominates the first loop.

* * * * *